2 Sheets--Sheet 1.
J. W. HARBIN.
Cotton and Corn Planters and Fertilizer Distributors.
No. 151,388.                              Patented May 26, 1874.
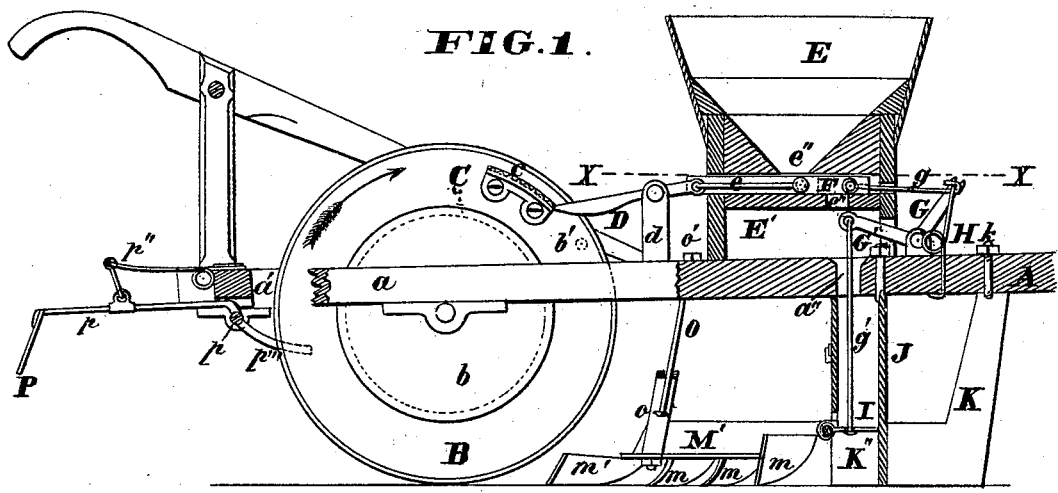
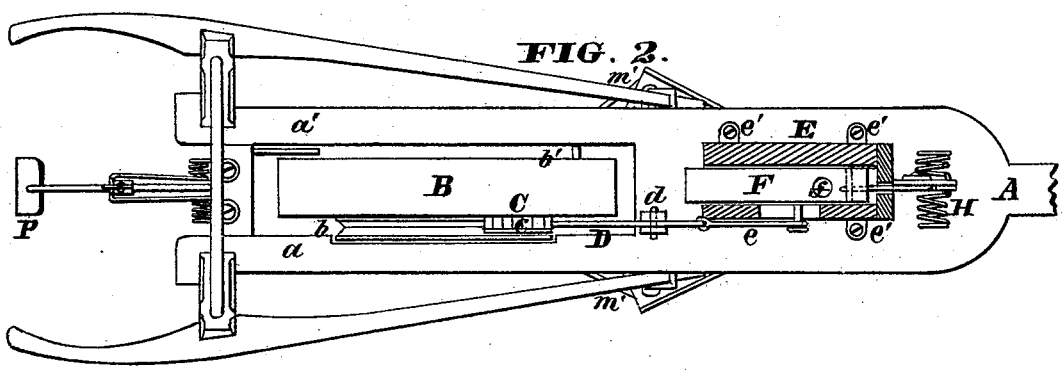
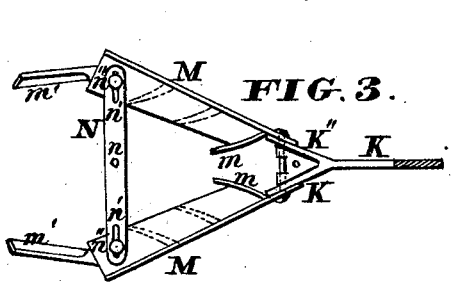
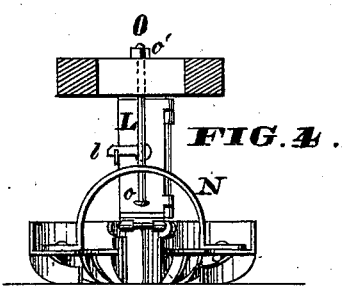
WITNESSES
Walter Allen
H. T. Tanner
INVENTOR
James W. Harbin
By Knight Bros Attorneys 2 Sheets--Sheet 2.

J. W. HARBIN.
Cotton and Corn Planters and Fertilizer Distributors.

No. 151,388. Patented May 26, 1874.

WITNESSES
Walter Allen
H. G. Tanner

INVENTOR
James W. Harbin
By Knight Bros. Attorneys

UNITED STATES PATENT OFFICE

JAMES W. HARBIN, OF MITCHELL, INDIANA, ASSIGNOR TO HIMSELF, JAMES H. SWAAR, AND MYRON H. LINCOLN, OF SAME PLACE.

IMPROVEMENT IN COTTON AND CORN PLANTERS AND FERTILIZER-DISTRIBUTERS.

Specification forming part of Letters Patent No. 151,388, dated May 26, 1874; application filed February 27, 1874.

*To all whom it may concern:*

Be it known that I, JAMES W. HARBIN, of Mitchell, in the county of Lawrence and State of Indiana, have invented a new and useful Convertible Corn and Cotton-Seed Planter and Fertilizer, of which the following is a specification:

This invention relates to an implement that is capable of being used for various purposes of planting corn or cotton-seed, or distributing any suitable fertilizing compound, as will presently appear.

The devices specially relating to planting corn will be made the subject of a separate application.

Like many planters, the principal members of my implement are, a main frame which carries the hopper, a ground-wheel that operates the seed-slide, and also serves to support said main frame, and, in addition to these, suitable appliances for opening the furrow and covering the earth over the deposited grain; but my implement differs from those in common use in the following important particulars.

First, the cam or eccentric, which is attached to the ground-wheel for the purpose of actuating the seed-slide, instead of being smooth on its effective face, is provided with a series of corrugations or projections that serve to impart to said slide an intermittent jarring or shaking motion in the plane of its stroke, the object of such shaking or irregular motion being to agitate the grain so thoroughly as to insure the complete filling of the cup. This vibratory motion also serves to prevent bunching or clogging of the grain, thereby rendering the delivery more regular and positive. Second, my implement is provided with new and peculiarly-constructed devices for making furrows in the ground, and for gathering the loose and friable earth upon the deposited grain, as hereinafter fully described. Third, for conveying the seed from the hopper and delivering it in a uniform manner, and in any required quantity, I employ an endless belt armed with card-teeth, a reciprocating serrated plunger, an oscillating feeder, an oscillating rake and cut-off, and a revolving doffer.

Figure 1 is a longitudinal section of the implement, the corrugated cam being shown engaged with the seed-slide mechanism, and the designator represented in its normal or elevated position. Fig. 2 is a plan of the same, the hopper being shown in horizontal section at the line X X. Fig. 3 is a top view of the coverer, and Fig. 4 a rear view thereof. Figs. 5 and 6 are, respectively, a side elevation and a top view of my implement, adapted for cotton planting and fertilizing. Figs. 7 and 8 are enlarged longitudinal and transverse sections of my cotton planting and fertilizing hopper. Figs. 9 and 10 are enlarged elevations of my upper feeder and my combined lower feeder and cut-off.

A represents the main frame of the implement, the rear portion of said frame being branched or forked at $a\ a'$ to allow the ground-wheel B to be journaled in it. Said frame has a seed aperture or passage, $a''$. This ground-wheel is of the usual size, and its periphery or "tread" is wide enough to prevent the weight of the implement forcing said wheel too far into the ground. Secured to one side of said wheel, and concentric with the same, is a scored pulley, $b$, for a purpose that will be fully described. Attached to the wheel B are one or any desired number of eccentrics or cams, C, whose effective faces are corrugated at $c$. These cams are adapted to impinge, at every revolution of the ground-wheel, against a lever, D, which is pivoted to the upper end of a standard or post, $d$, the latter projecting vertically from the frame A, and capable of being readily detached therefrom when desired. Proceeding from this lever is a connecting-rod, $e$, which communicates with the seed-slide F that is adapted to have a reciprocating movement longitudinally within the detachable hopper or grain-box E. This slide is provided with the customary cup or seed-cell $f$, of any suitable size and shape. $e'$ are angular brackets, which serve to attach the hopper E to the frame A, while, at the same time, they allow said hopper to be readily removed when the implement is to be used as a cotton-seed planter. The sides of the hopper E converge to a throat, $e''$. The slide F is supported upon a diaphragm, E', having an aperture, $e'''$, on a direct line with throat $e''$. Pivoted to the main frame, in front of the hopper, is a bell-crank having two arms, G G', of which the upper arm, G, has a rod, $g$, attached to it, said rod communicating with the slide F, as more fully shown in Figs. 1 and 2. Attached to the lower arm, G', of the aforesaid bell-crank is another rod, $g'$, that descends within the grain-spout J, and operates the second or delivery valve I. A spring, H, that engages with the upper arm of the bell-crank, serves to restore the slide F and the valve I to their delivery and closed positions, respectively, whenever liberated from the action of the cam C. A colter, K, attached to the beam by a bolt, $k$, separates rearwardly into two portions, K' K'', which form a continuation of the front of the tube J below the valve I, leaving the rear open. The rear side of the tube J above the valve I is closed by a door, L, fastened by a latch, $l$. Pivoted in rear of the tube J are two dividers and coverers, M M', held at any degree of divergence by the bowed coupling N. Said coupling is perforated, $n$, to receive a rod, O, hooked, $o$, at its lower extremity, and at its upper end fastened to the beam by nut $o'$. This mode of attachment enables the rod O to be elevated or depressed, so as to limit the descent of the coverer. The coupling N is slotted, $n'$, to receive bolts $n''$, which attach it to the coverers, and hold them to any desired divergence. Projecting from the lower sides of the coverers are oblique cutting-blades $m$ and covering-blades $m'$, which serve to remove clods and other large particles, while, at the same time, permitting the more friable earth to pass through. They further operate to scrape such earth into the form of a ridge over the just planted seed. This dividing-coverer floats on the surface, so as to operate with equal effectiveness both on elevated and depressed portions of the ground. In order to leave a mark on the ground where each hill of seed has been planted, I provide what I call a designator, the same being a hoe, P, whose helve, $p$, is pivoted, $p'$, to the beam and held at the represented elevated position by spring $p''$. A prolongation, $p'''$, of the helve being struck by tappet $b'$ on wheel B, causes the sudden descent of the hoe so as to mark the ground by a hill, and, if desired, to deposit earth upon the seed just planted. There are, of course, as many tappets as there are cams C. Thus, suppose it be desired to plant at three-feet intervals, a wheel of six feet circumference will be furnished with two cams and as many accompanying tappets.

When the implement is to be employed for planting cotton-seed the parts D, E, F, G, H, and I are removed, and there is attached to the beam a hopper, Q, which is divided interiorly by partition $q$ into a seed-compartment, R, and a fertilizer-compartment, S. Extending horizontally athwart the hopper, near its lower portion, are two shafts, T T', of which one is adjustable by screws U. The shafts carry pulleys $t$ $t'$, around which is stretched an endless cord or band, V, armed with points or hooks similar to those employed in cotton-carding machines. The shaft T extends outside of the hopper, one of said protruding ends having a scored pulley, W, that has belt-connection, $w$, with the pulley $b$ on ground-wheel B. The same portion of shaft D has also a spur-wheel, X, which gears with two pinions, $y$ $z$, of which one, $y$, carries a spiral wallower, Y, which extends athwart compartment S, and of which the other pinion, $z$, carries a revolving doffer or beater, Z, which extends across the lower portion of the hopper opposite the delivery of the endless belt or conveyer, V. The other extremity of shaft T has a short crank, 1, which connects, by rod 2, with a longer crank, 3, on the end of a shaft, 4.

Attached to the shaft 4, by bolts 5 entering slots so as to be vertically adjustable, is my oscillating rake 6, which, according to the height to which it is adjusted, operates to rake back more or less of the surplus cotton-seed. A partition, 7, attached to the same shaft, also adjustably, and oscillating with said rake, co-operates therewith in preventing the passage forward of an improper amount of seed. A screw, 8, enables the accurate adjustment of the oscillating rake and cut-off. Projecting horizontally from the shaft 4 is an arm, 9, which arm terminates with a serrated feeder, 10, having an oscillating motion, which differs from that of the rake 6 only in being in a nearly vertical arc instead of a horizontal one. A wrist or hook, 11, which projects from the shaft 4 within the hopper, connects by a rod, 12, with rock-arm 13 of shaft 14, from whose opposite rock-arm 15 is suspended a bar or plate, 16, armed with a series of serrated blades, 17 18, the whole constituting a plunger, whose office is to separate and drag down portions of the cotton-seed. A chute directs the seed onto the feeding apparatus, as above explained. A chute, $r$, directs the cotton toward the rear end of the hopper. The fertilizing compound descends from compartment S through aperture $s$, and thence through aperture $a''$ into tube J.

The operation of my implement, when used for corn, is as follows: The onward movement of the implement causes the cam C to strike the lever D, which in turn draws back the slide F, so as to bring its orifice $f$ under the vent $e'$ of the hopper, the corrugations $c$ of the cam causing a sharp and rapid agitation of the slide, which insures its being filled with corn. The instant that the lever D escapes from the cam, the spring H operates to draw forward the slide, and to bring its orifice over the aperture $e''$ whenever the seed drops through aperture $a''$ into the spout J, where it is caught by the valve I. At the next backward stroke of the slide, and while the orifice $f$ is being filled a second time, the valve-opening discharges its modicum of grain, closing again, as the slide shoots forward, in time to receive the succeeding charge of seed. The seed drops into the furrow made by the colter K K' K'', whose blades $m$ serve to turn aside or cut through clods, rocks, and other large and intractable fragments, while they permit the finer earth and mold to remain, and whose blades $m'$ serve to gather said friable earth, and to heap it up over the deposited seed. These operations having been effected, the hoe P descends and marks or designates the exact place of deposit of each hill of seed.

The operation of my implement, when employed for cotton-planting and fertilizing, is as follows: The hopper Q is substituted for the hopper E, and its pulley W connected by belt $w$ with pulley $b$ on the ground-wheel, and the compartments R and S are supplied with cotton-seed and fertilizer, respectively. The machine being then drawn forward, the toothed plunger 16 drags down cotton-seed, which, in turn, is taken by the oscillating feeder 10 and deposited upon the conveyer V, from which the rake 6 removes any redundancy of seed. The balance of the seed, then passing on, is removed from the conveyer by the doffer Z, which, in turn, strikes down the seed so as to enter the discharge-aperture $a''$, whence it passes by tube J onto the ground, and is covered with loose earth by the blades $m'$, precisely as in case of corn, as already explained.

I claim as new and of my invention—

1. The corrugated cam C $c'$, applied to the side of the driving wheel B of a cotton-seed planter, to adapt it for use in planting corn, in the manner described.

2. The floating divider, gatherer, and coverer K K' K'', having the adjustable wings M with the oppositely-oblique blades $m$ and $m'$, elevated bow or brace N, and adjustable rod O, combined as specified.

3. In a cotton-seed planter, the combination of an endless-belt conveyer, V, armed with card-teeth, and the plunger 16 armed with one or more serrated blades, 17 18.

4. In a cotton-seed planter, the combination of the toothed conveyer V and oscillating feeder 10, substantially as set forth.

5. The combination, with conveyer V, of the oscillating rake 6 and cut-off 7.

6. The combination of feeding devices 16, 10, 6, V, and Z, adapted to co-operate, as set forth.

In testimony of which invention I hereunto set my hand.

JAMES W. HARBIN.

Attest:
 GEO. H. KNIGHT,
 JAMES H. LAYMAN.